United States Patent [19]

Buchanan et al.

[11] 4,351,035

[45] Sep. 21, 1982

[54] METHOD OF AND APPARATUS FOR LOCATING DISTURBANCES IN A MINERAL SEAM

[75] Inventors: David J. Buchanan, Burton-on-Trent; Iain M. Mason, Oxford, both of England

[73] Assignee: Coal Industry (Patents) Limited, London, England

[21] Appl. No.: 86,628

[22] Filed: Oct. 19, 1979

[30] Foreign Application Priority Data

Oct. 20, 1978 [GB] United Kingdom ............... 41420/78

[51] Int. Cl.³ .............................................. G01V 1/00
[52] U.S. Cl. ...................................... 367/14; 367/48; 367/49; 367/73
[58] Field of Search .................. 367/9, 14, 73, 37, 64, 367/75, 48, 49; 181/111, 112

[56] References Cited

U.S. PATENT DOCUMENTS

| | | | |
|---|---|---|---|
| 3,691,517 | 9/1972 | Riggs | 367/9 |
| 3,858,167 | 12/1974 | Stas | 367/75 |
| 4,209,853 | 6/1980 | Hyatt | 367/9 |
| 4,214,226 | 7/1980 | Narashimhan et al. | 367/57 |

*Primary Examiner*—Howard A. Birmiel
*Attorney, Agent, or Firm*—James C. Wray

[57] ABSTRACT

Faults in an underground coal seam are located by firing a shot at one point in the seam and detecting the seismic reflections in an array of geophones. Signals from the geophones are recompressed and analyzed according to an exponential formula to give a holograph of the seam and to predict the fault pattern.

20 Claims, 15 Drawing Figures

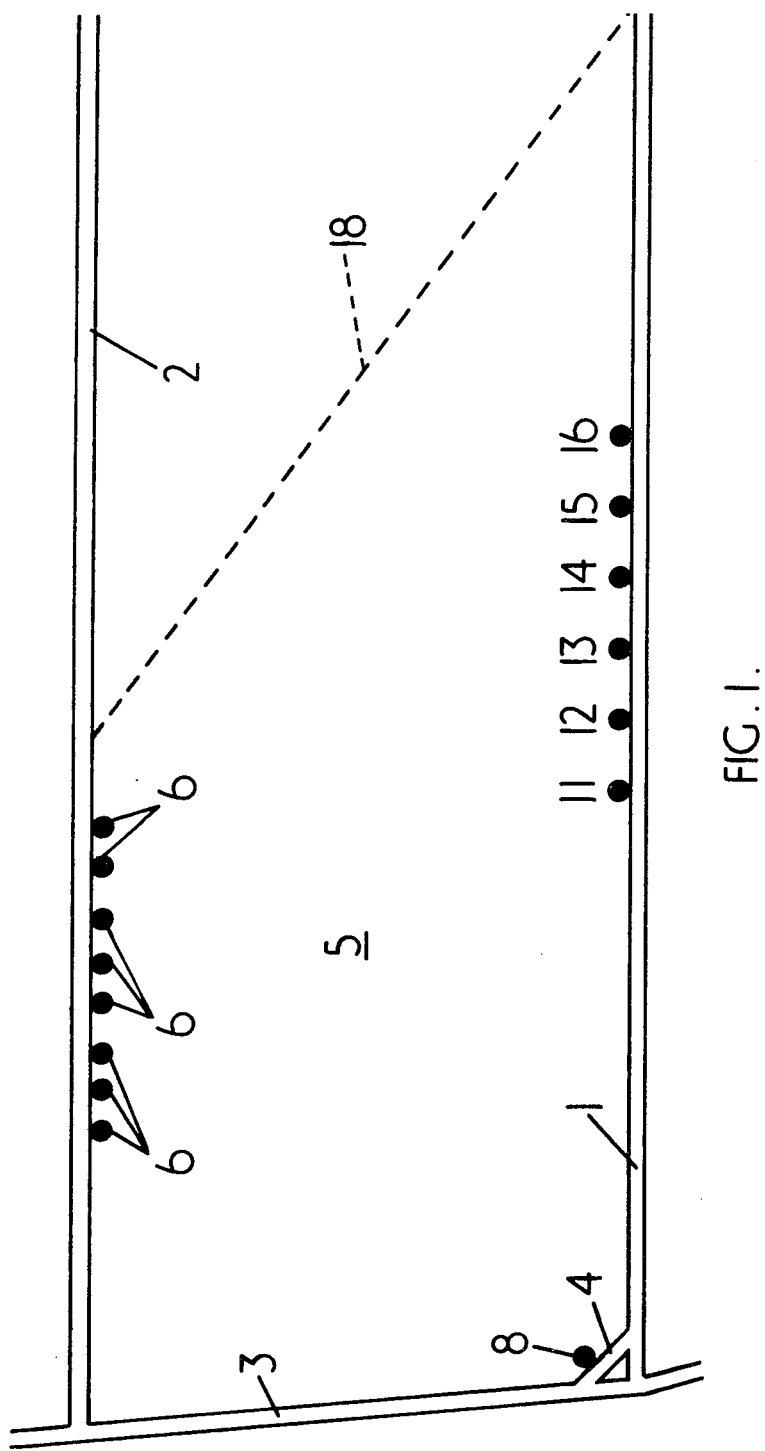

METHOD OF AND APPARATUS FOR LOCATING DISTURBANCES IN A MINERAL SEAM

This invention relates to a method of and apparatus for locating disturbances, for example faults in a mineral seam.

Much of the coal mined in the United Kingdom is mined by longwall face mining. In longwall face mining, a coalface is formed where the coal seam is being worked, and coal is won by a machine which traverses to and fro on an armoured face conveyor arranged adjacent to the coalface. Mine roof on the side of the conveyor away from the coalface is supported by a plurality of self advancing mine roof supports, and mine roof behind these supports is allowed to collapse.

It may take several months to set up a face, and the capital cost is substantial. An early, unexpected termination of the lifetime of a face leads to a serious loss of production and is a substantial drain on revenue. A considerable number of faces do not continue for their projected life time. Most of the early closures can be attributed to unanticipated geological conditions; in particular, geological faults.

Any fault encountered during the advance disrupts production. It also effects the integrity of the hydraulically supported roof. A throw encountered head-on brings with it flooding and/or fire risks. A diagonal fault, of the order of the seam thickness, can be carried at the cost of cutting dirt or hard rock over 20% of the face line. A larger throw can lead to the face being abandoned.

An underground seismic method, based on channel waves, for detecting small (and large) faults has been suggested. A body of knowledge has been built up over the past decade on the theory of channel wave propagation and scattering. A practical application of this theory has however not tended to be entirely successful.

Holographic procedures for imaging structure buried beneath the earth's crust have been suggested and tried. However, seismic holography has not found widespread application. The crust is three dimensional, and inhomogeneous. The computational problems that face broadband holograph in normal surface seismology present acute difficulties.

An object of the present invention is to mitigate the above mining problems.

According to one aspect of the present invention a method of locating disturbances in a mineral seam comprises locating disturbances in a mineral seam and is characterized by locating in the seam underground at a first area, an array of detectors and at a second area a point source of sound, operating the point source to generate seismic waves and detecting reflections of the waves in the array of detectors and converting said reflections into electrical signals, processing said signals to produce a recompressed signal and producing a holograph indicating any disturbances in the form of an exponential characteristic related to the phase and group velocities of the centre frequency of the frequency band.

The method preferably includes using either a focused radial or elliptical time lag imaging of the waves or a combination of both.

The recompressed signal preferably has any noise element deleted, and the recompression is affected by warping the spectra of the electrical signals.

The exponential characteristic may be identified by the formula:

$$I(x,y) = \left| \sum_{n=1}^{N} S_n(t_n) \exp[i\omega_c(1 - c_p/c_g)t_n] \right|^2$$

The recompression may be performed by passing the electrical signals through a time varying, finite impulse response pulse compression filter.

According to another aspect of the present invention, apparatus for locating disturbances in a mineral seam comprises a source of seismic waves, and an array of detectors for the seismic waves, and processing means for electrical signals generated by the detectors when waves are detected, the circuitry including means for recompressing the signals and further means arranged to produce a holograph of the seam from the recompressed signals.

An embodiment of the present invention will now be described by way of example only with reference to the accompanying drawings in which:

FIG. 1 is a diagrammatic view of a mining installation,

Figure 5A:
Figure 5B:
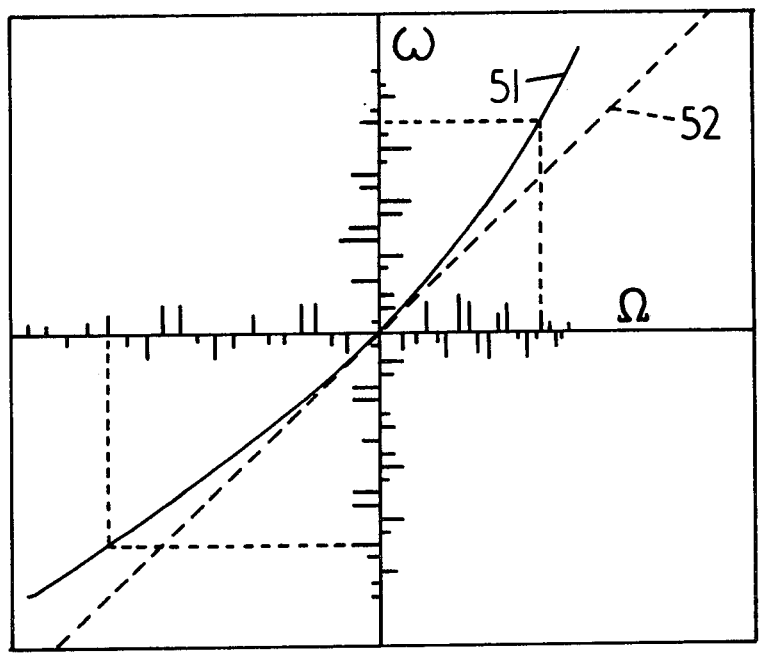
Figure 5C:

FIGS. 5(a), 5(b) and 5(c) show a spectral warping and its effect on signals.

Figure 6:
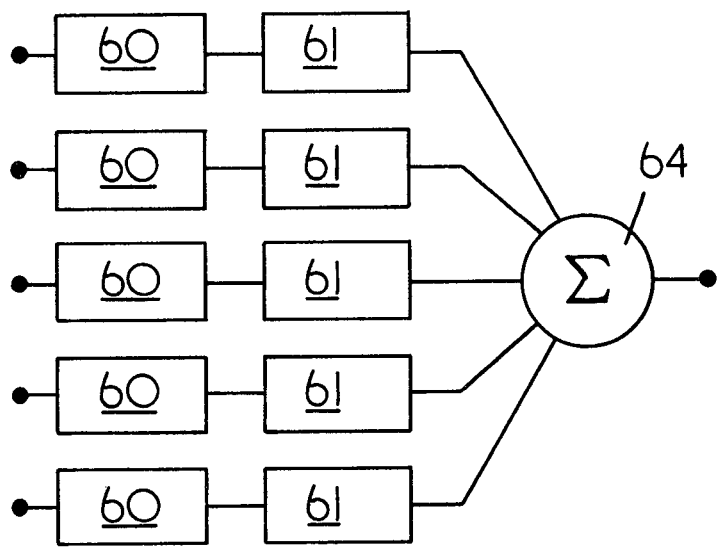

FIG. 6 is a block diagram of delay units, phase shifters and processor.

Figure 3:
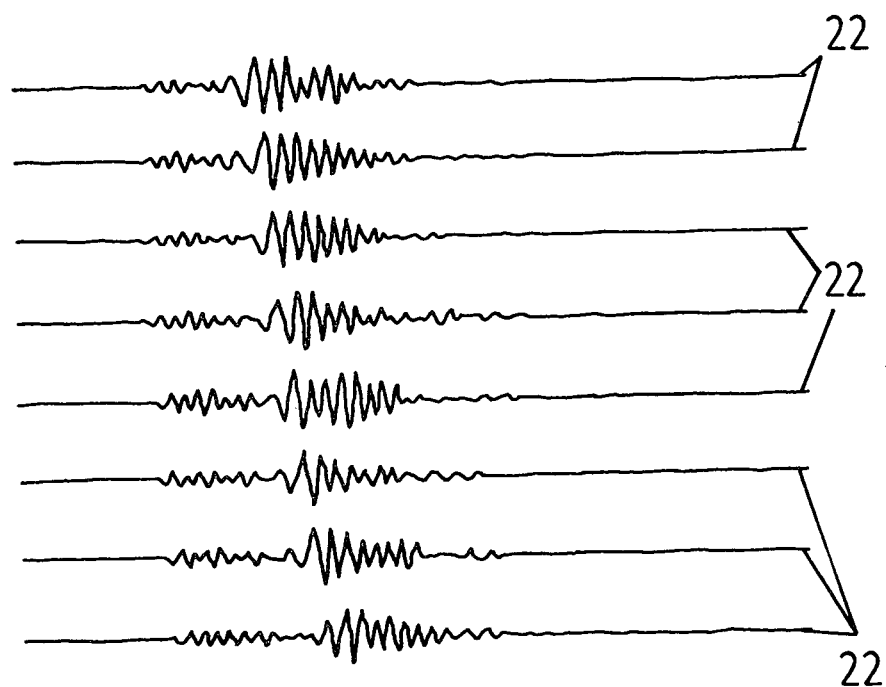
FIG. 3 shows a plot of seismic signals.
Figure 7:
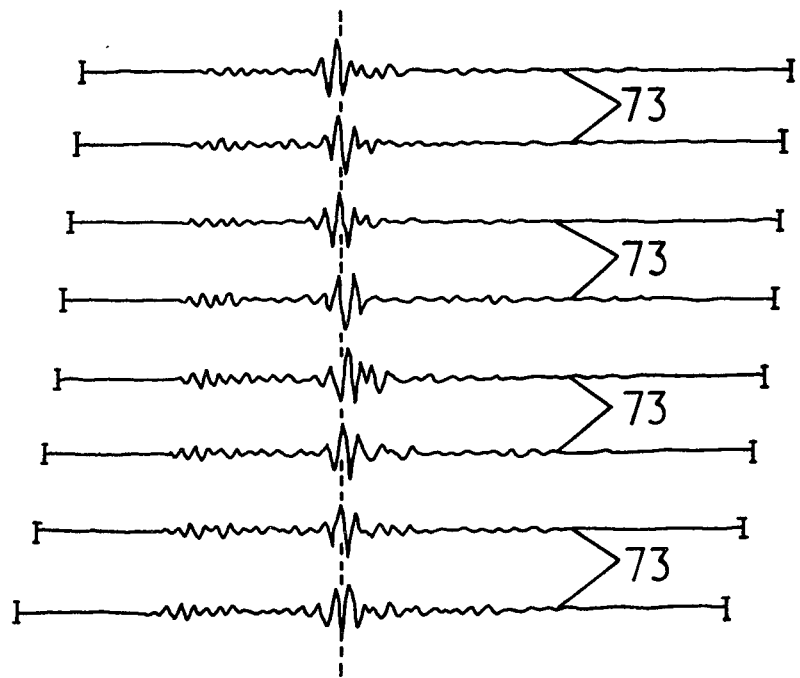
Figure 8:
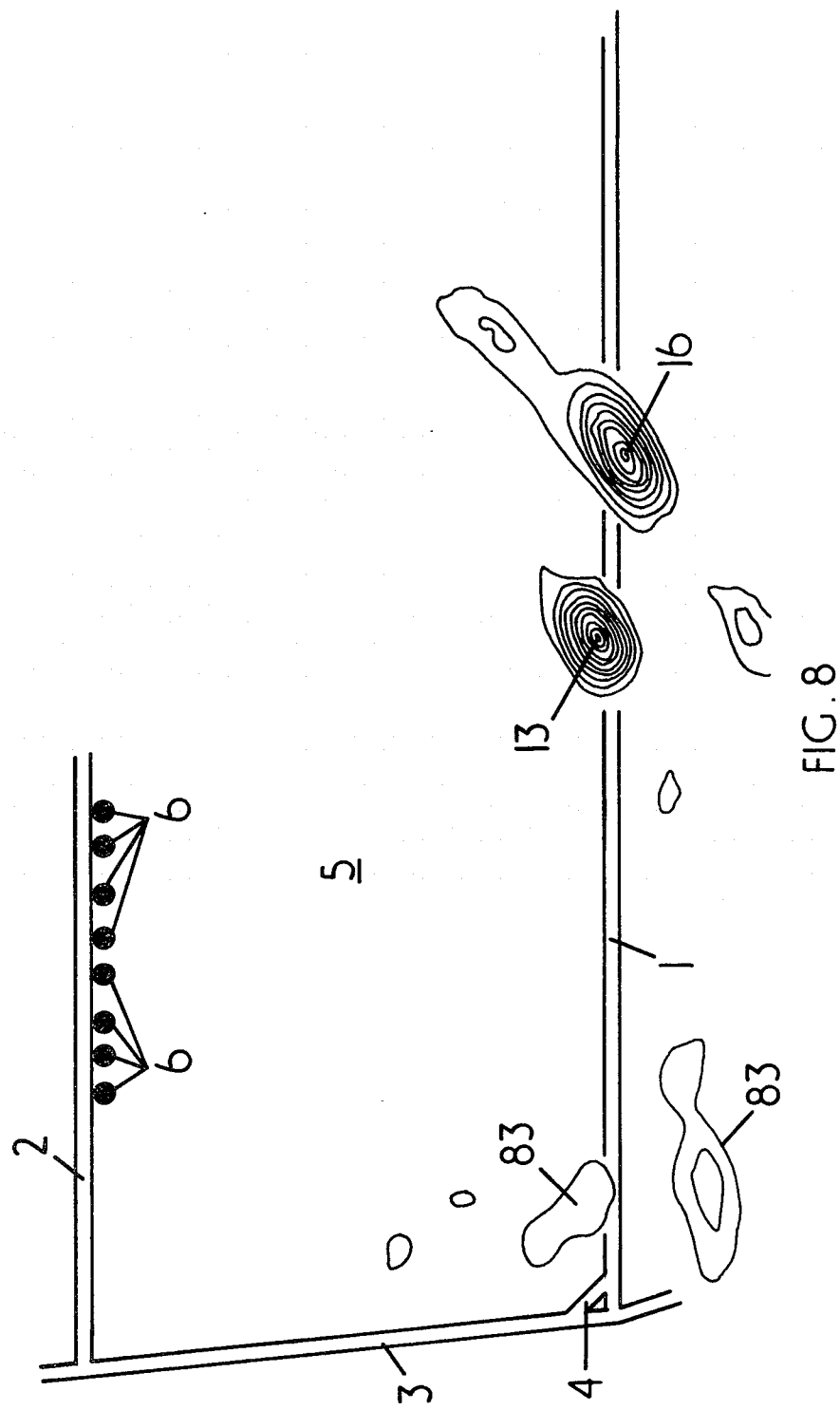
Figure 9:
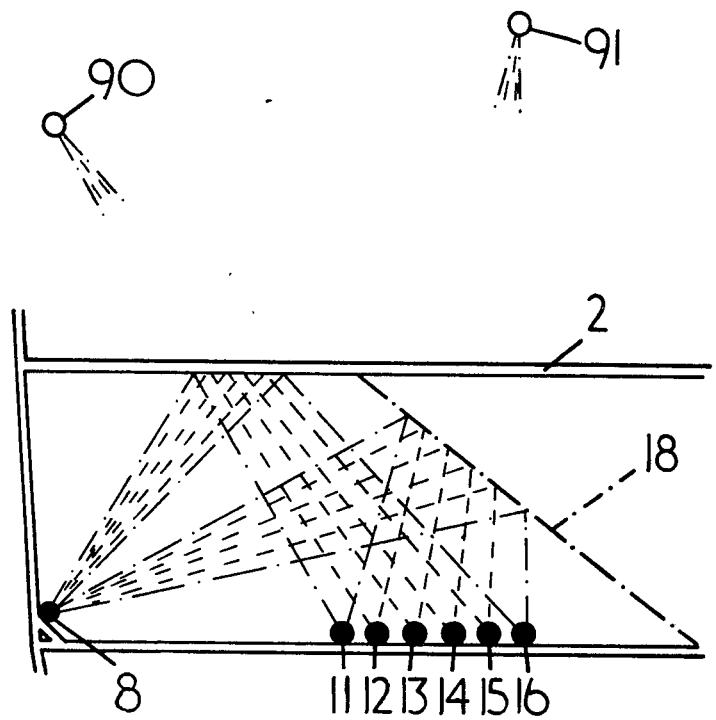
Figure 10:
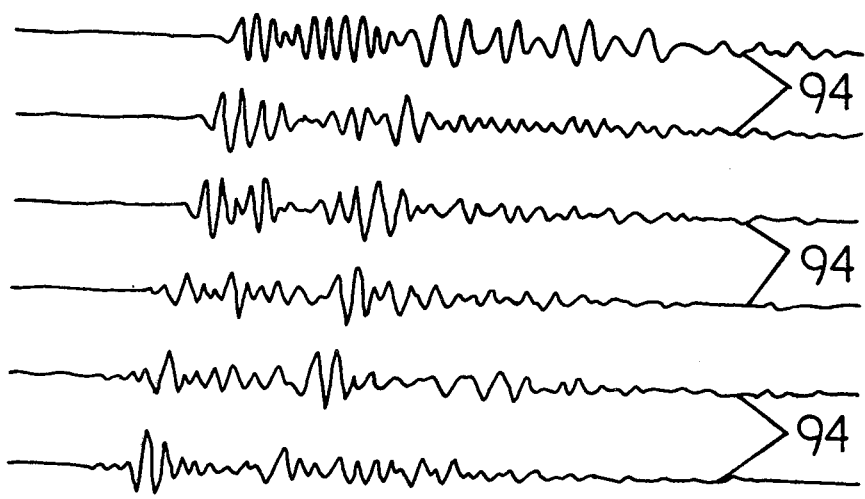
Figure 11:
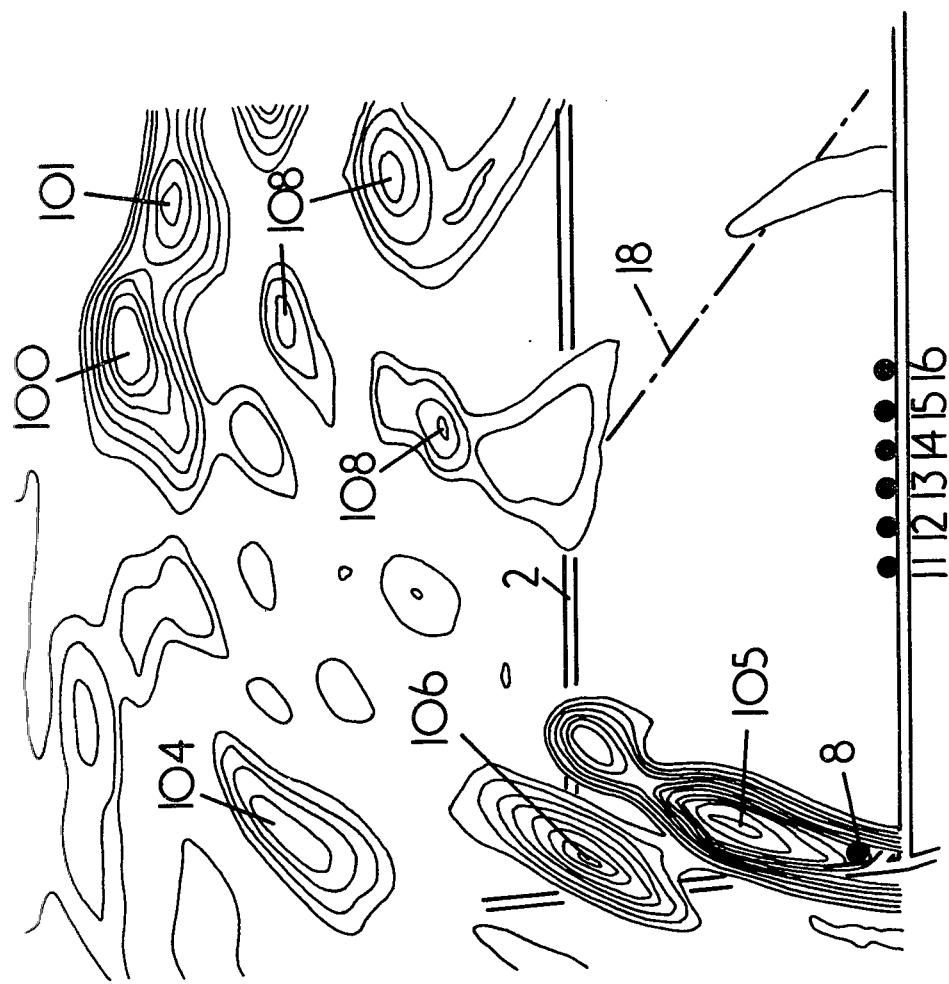
Figure 12:
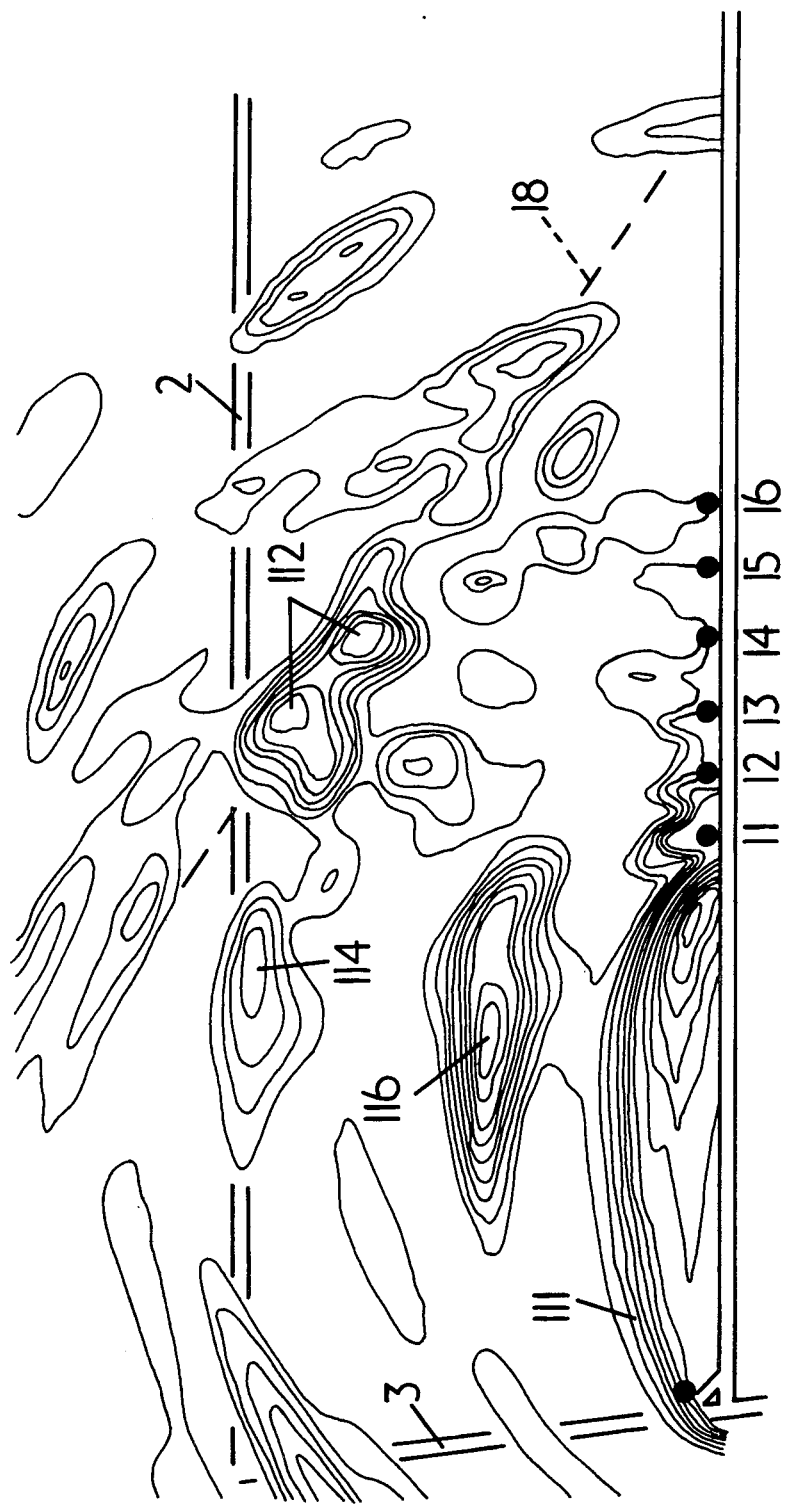

FIG. 7 shows the signals of FIG. 3 after some processing,

FIG. 8 is a seismic diagram in the form of a holograph,

FIG. 9 is a diagram of ray paths,

FIG. 10 shows seismic disturbances connected with the ray paths of FIG. 9,

FIG. 11 is a seismic diagram in the form of a holograph of the installation of FIG. 1 and FIG. 12 is a different seismic diagram of the installation of FIG. 1.

Referring to FIG. 1, mine roadways are indicated at 1, 2 and 3. A spur 4 connects the roadways 1 and 3. An unmined panel of coal seam is shown at 5. Eight sources 6 of seismic channel waves are buried in the coal seam 5 from the roadway 2. The sources comprise two hundred twenty-seven gram charges buried to a depth of one meter in the seam. A ninth source 8 is shown in the spur 4 and is disposed in the coal seam in a similar manner to the sources 6. An array of geophones 11, 12, 13, 14, 15 and 16 is arranged in the coal seam 5 adjacent to the roadway 3. The geophones generate electrical signals corresponding to received seismic waves. A known fault in the coal seam is indicated by 18.

Figure 2A:
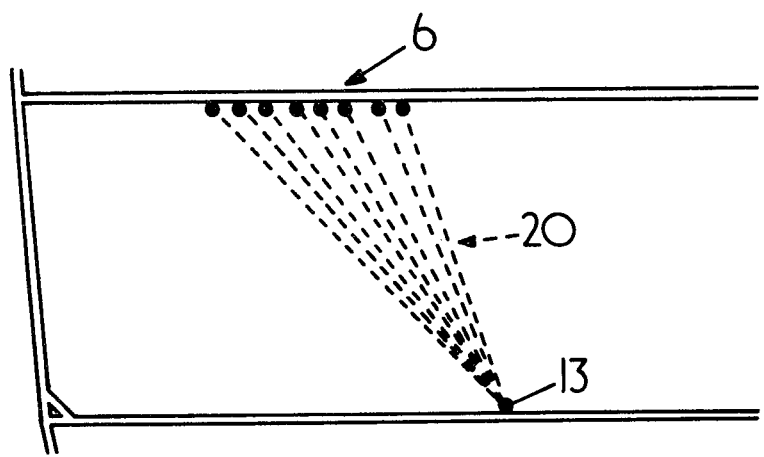
FIG. 2(a) shows ray paths occuring in part of FIG. 1.

Referring to FIG. 2(a), ray paths 20 for the seismic waves from the sources 6 to the geophone 13 are shown, the ray paths being followed by seismic channel waves as will be explained below. The ray paths form a superficially uncomplicated fan of transmission through the coal.

FIG. 3 shows a set of eight synchronised traces 22 sensed by the geophone 13. Two overlapping arrivals of seismic waves are apparent in the traces owing to dispersion of the channel waves, the one being generally to the left and the other generally to the right. In FIG.

2(b), an electrical delay line 23 is shown diagrammatically, and the tapping points 24 for the sources 6 and 8 on the line are shown by 24 and 26 respectively. The tapping points are set at distances which correspond to the radial distances between the sources 6 and geophone 13. The tap array sees the output geophone under consideration in endfire. The tapped signal is conditioned in its travel through the array by the dispersion characteristics of the coal seam. If the delay line input is impulsive the tapped, time domain signals represent samples of the space-time field point spread function.

Figure 4:
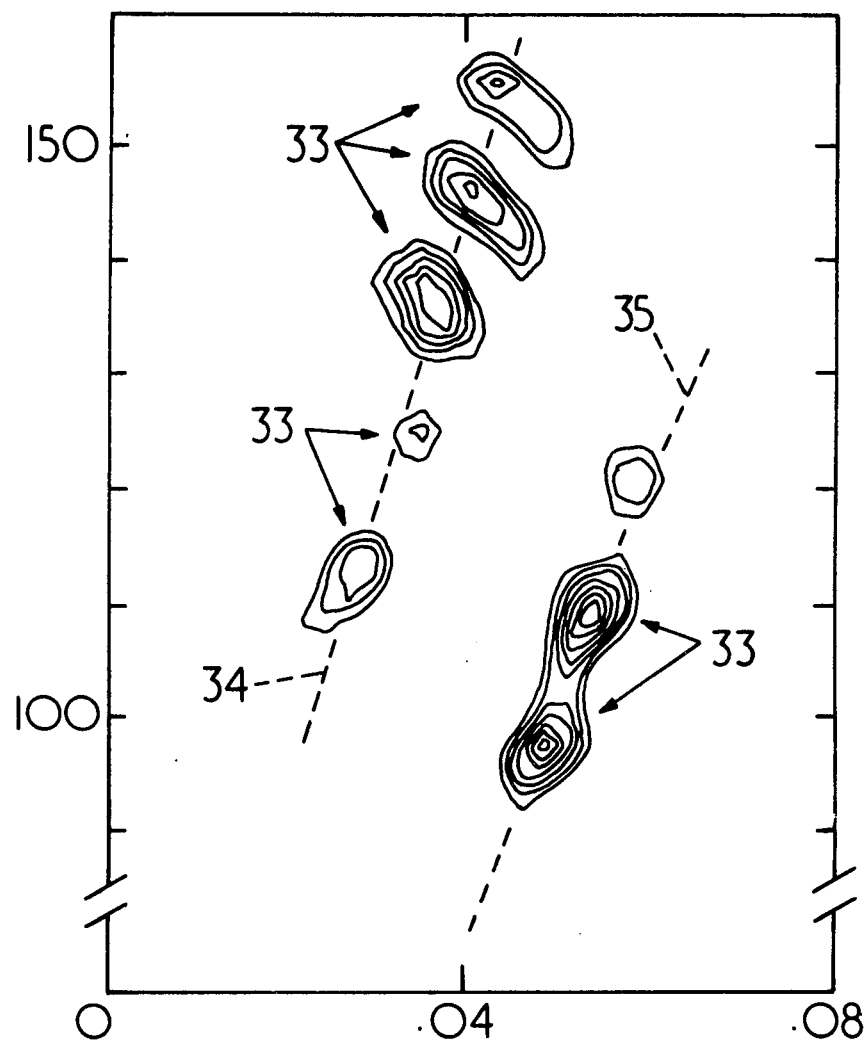
FIG. 4 shows a graph of dispersion characteristics.

Channel wave dispersion can be analysed using wavefront decomposition by examining the temporal and spatial periodicity of the tapped signal set shown in FIG. 3. In FIG. 4 there is shown an intensity distribution in a small region of frequency-wavenumber space. Frequency in Hertz is plotted as ordinate and wavenumber in metric as abscissa. This distribution was produced by Fourier transforming the signals of FIG. 3, individually, into the frequency-space domain, and then Fourier transforming each spectral component of the set as a whole into wavenumber space.

Contour peaks 33, in FIG. 4 are constrained by the mechanical properties of the seam to follow the intersection of two sheets of the channel's dispersion characteristic with the chosen frequency-wavenumber plane. These sheets characterise the two relevant imaging modes. Two parabolic arcs 34, 35 follow the contour peaks over the bandwidth imposed by source coupling and attenuation with an accuracy sufficient for imaging (in the time domain) within a Fresnel analogous approximation.

The fact that a parabolic approximation to the dispersion characteristic appears adequate over the signal bandwidth means that for fault detection arrival of quasi-Airey phase groups alone cannot be relied on. Echo envelope spreading, in the time domain, reflects a progressive encoding, by the channel itself, of amplitude modulation into phase modulation. The RF burst that is assumed to be injected by the original explosion becomes increasingly distorted or chirped as it travels.

It is necessary to restore seismic signals to a form approximately to the original excitation; such restoration is termed recompression.

One method of accomplishing recompression consists of passing the seismic echo train through a time varying, finite impulse response pulse compression filter. An alternative involves warping the spectrum of each complete train. Spectral warping is a non-linear operation. It is well suited to being performed by digital implementation. Turning to FIG. 5 a received signal is shown in FIG. 5(a). The received signal has a frequency range included in the axis of ordinates ω in the FIG. 5(b). The frequencies ω are non-linearly transformed to wavenumbers Ω (plotted as abscissae) according to the curve 51. (A linear transformation is indicated by curve 52). The recompressed signal is shown in FIG. 5(c). The effect of warping as indicated in the FIG. 5, is to bring each echo derived from a single moded coal seam waveguide simultaneously into focus in the time domain. Some detail of a compression technique are explained by Booer, A. K., Chambers, J, and Mason I M, Fast Numerical Algorithm for the Recompression of Dispersed Time signals in Electronics Letters 13, 453–5.

Referring to FIG. 6, there is shown a group of delay units 60 and phase shift units 61 and processor 64. FIG. 7 shows the signals of FIG. 3 now indicated by 73 after suppression of signals corresponding to the first seismic signal arrivals, warping of the spectrum of each trace and then passage through the delay unit 60. The second mode arrivals are transformed into amplitude radio frequency (RF) burst to become suitable for application of the time domain focussed lag sum holographic processor 64 (see FIG. 6). Operation of the processor 64 is described in operation below.

FIG. 8 shows a seismic test diagram for the processor 64 and will also be described more fully below.

Referring to FIG. 9, there is shown a ray path for seismic signals from the source 8. It will be seen that reflections occur at the seam boundary with the roadway 2 and also at the fault 18. Virtual sources 90 and 91 represent these reflections as will be further described below.

FIG. 10 shows similar electrical signals 94 as FIG. 3 but corresponding to actuation of the source 8. A similar signal is derived by each of the geophones as will be described in operation below.

FIGS. 11 and 12 show seismic charts derived from the signal of FIG. 10 by the processor 64 as described in operation.

Figure 2B:
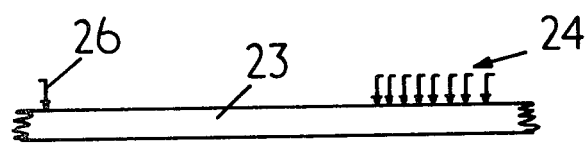
FIG. 2(b) shows a delay line.

In operation now described with reference to all the Figures, the dispersion characteristics of the coal seam 5 are established by construction of graphs such as that shown in FIG. 4. The information for the graph is obtained by actuating a source or sources, the seismic waves from which follow a superficially simple ray path as indicated in FIG. 2 above using a delay line as aforementioned. The electrical signals derived in the geophones and corresponding to the seismic signals are recompressed as described above with reference to FIG. 5. For further understanding of operation of the invention it is necessary that focussed lag sum imaging be explained. A method of implementing numerous broadband holography is provided by the focussed lag sum imaging.

A focussed lag sum processor operates in space-time by estimating the probability of a source being present, or a scattering interaction having taken place, within each picture cell of a map I(x,y). A travel time $t_n$ is associated with a picture cell and any particular detector (i.e. geophone). The probability of an event within that cell is assigned on the basis of the signal amplitude $(S_n)$ at the detector that falls within the calculated time slot. The process is repeated for all detectors and the results summed. Thus $$I(x,y) = \left| \sum_{n=1}^{N} S_n(t_n) \exp\left[i\omega_c(1 - c_p/c_g)t_n\right] \right|^2$$

In the above equation x and y are the co-ordinates of the picture cell $t_n$ the calculated travel time, $\omega_c$ the centre frequency of the band, and $c_p$ and $c_g$ the phase and group velocities respectively at the centre frequency.

The exponential factor is important in imaging underground. It is designed to take up the RF phase roll that arises in dispersive space from the difference that exists between group and phase velocities. This roll is evident in FIG. 7. The signals there have, after spectral warping, been operated upon only by the focussed group delay element at the input of the processor. The envelopes of one particular signal are accurately aligned, but visual inspection of the signal set will show that the RF phase is not.

A problem associated with a focussed lag sum processor lies in the computational effort that is required to calculate the travel time $t_n$ for each cell-detector in the field. An advantage is its flexibility, a virtue that is not usually shared by holographically analogous processors that operate in the frequency-wavenumber domain. The sources and detectors can easily be assigned to any position in the mapping field. The I(x,y) map projected by the focussed lag sum operator can be varied simply by changing the basis for calculating the lag $t_n$.

The lag sum is used in two forms. In the first radial lag sum (RLS) the lag between picture cell and detector is calculated. The resulting map provides a measure of the probability distribution of real and virtual sources in the field. In the second variant, elliptical lag sum (ELS), the lag between the real source, the cell, and the detector is calculated. The resulting map indicates, as might for example, a radar plan position indicator (PPI) display, the probable distribution of scatterers in the field.

An opportunity both to check the focussed lag sum processor, and to test the homogeneity of the seam is provided by the transmission data. The genuine locations of the sources and geophones are known and can easily be compared with the positions as predicted from the map. The transmission data set is simple, and is not significantly obscured by echoes; hence, the quality of the map produced can easily be examined.

In FIG. 8 an RLS map of the two geophones 13 and 16 is illustrated. Essential details of the site plan are superposed on this map. The small, solid semicircles on the map indicate the location of the shots used for the synthesis. The signal set, S($t_n$), underlying this map consists of a superposition of the traces, from geophone 13 shown in FIGS. 3 and 7, and a very similar set derived from the geophone 16. The traces emanating from each shot were first added, and then processed through bandpass and spectrum warping filters, to provide an input to the lag sum processor 64.

Contour intervals on the map produced were set at one-tenth of the peak intensity, located at geophone 13 on the map. The lowest contours capture, beside the geophones, the ambiguity sidelobes created by the finite aperture function. The Large area ambiguity lobes 83 on the lower left-hand side of the map in FIG. 8 can be identified as first negative diffraction orders of the geophone peaks themselves, by comparing the mean source spacing of 20 m to the 18.7 m wavelength of the slow mode chosen for imaging, at the principal frequency (110 Hz).

The aximuthal resolution apparent in this map compares favourably with the theoretical estimate of the best possible resolution available from an 8.5 wavelength focussed aperture, imaging through homogeneous space. Thus it can be concluded that coal seam 5 offers a suitable homogeneity for the application of broadband holography.

In FIG. 9, as mentioned above, there is sketched the principal known ray paths associated with the reflection shot, that was detonated in the spur 4 (FIG. 1). The signals shown in FIG. 10 are considerably more complicated than those of FIGS. 3 and 7. The shot from the source appears to the (non-uniformly coupled) array of geophones as a set of at least three synchronised sources. Two of these sources are virtual.

An RLS map, based upon a suitable warping of the signal set of FIG. 9, is shown in FIG. 11. Essential site plan details are superposed. The semicircles at the bottom of the map indicate the positions of the relevant geophones. These geophones are separated from one another by 30 m.

The figure would have been cluttered by ambiguities if mapped in the slow mode with a wavelength of 18.7 m. Instead a fast mode with a 33 m wavelength is mapped, which has the beneficial side effect of pushing overmoding noise due to the slow mode over the edge of the mapped field.

The complexities in map interpretation can be overcome by considering the map in relation the the ray optic diagram shown in FIG. 9. Immediately ahead of the array of geophones 11 to 16, in FIG. 11, almost on boresight at 12 o'clock, two fairly strong virtual sources 100, 101 are visible. These are the images of the shot seen in the diagonal fault 18 across the coal seam. There are two vertical sources because the fault is probably broken. At almost the same range, at around 11 o'clock, there is a weak image 104 of the shot seen in reflection. At between 9 and 10 o'clock (rather than at 9 as might be expected) there is the dominating image 105 of the shot itself. Its first sidelobe is evident on the same radial arc centred on the array.

Between the shot peak and its first order sidelobe, at a slightly greater distance from the array, there is a well formed anomalous peak of a strength so great that it cannot be ignored. It appears to be an additional virtual image 106 of the source. Such an image would be seen if a specular line fault lay in the middle of the panel parallel to the geophone array.

Many of the other contour patterns 108 in FIG. 11 can be identified as subsidiary ambiguity lobes of the four principal peaks listed above. These ambiguities are present because the imaging array is sparse, finite, and poorly coupled. These subsidiary peaks are dismissed from further discussion as they are not themselves indicative of substantive disturbances. It has so far been discovered that the panel of the seam may be in two and the source image displaced on the map from its true position in the field.

The map in FIG. 11 was constructed on the assumption that the seam was homogeneous and that its dispersion characteristics were accurately determined from the transmission data. In the mapping of the geophone pair (FIG. 8) from transmissions through the body of the panel, both assumptions appeared reasonable. In FIG. 9 the source-geophone direct path does not pass through the body of the panel but along its edge.

In the immediate vicinity of any roadway there is a region of high stress called the abutment zone. Body stress, below the limit of ultimate failure, usually raises the velocity of propagation. By raising the phase velocity that we used in mapping FIG. 11 by only 10% it is found that the image of the source can be shifted to its expected position.

Given that the edge of the coal seam is acoustically inhomogeneous the number of possible interpretations of the map grows. Overmoding, edge guiding, and ray bending arguments over and above explanations based on local modifications to the dispersion characteristics may be considered in order to interpret artefacts on any map.

In order to examine these arguments fully it is necessary to characterise all the possible distributed inhomogeneities (e.g. a lens produced by a washout) that conceivably might exist. Owing to the analysis performed above in connection with FIG. 8 however it can be accepted that the data set is distorted only by a simple propagation anomaly because the two geophones in FIG. 8 were images successfully without significant distortion.

The elliptical lag sum ELS procedure, introduced above provides a convenient format for comparing known faults structures in the panel surveyed to the distribution of scatterers within the seam itself. ELS involves the calculation of travel time between the source, each addressed picture cell, and each detector in the array. In FIG. 12 the contour map of the probable distribution of scatterers in the seam that is suggested by a ELS map based on the data set of FIG. 8 is shown. In mapping with the fast mode seam homogeneity has been assumed. The signal traces, as in FIG. 11 were spectrally warped to bring the fast mode arrivals into focus in the time domain. Essential site plan details have been superposed on the contour map.

The sources (real and virtual) generated by the reflection in the diagonal fault 18 and the roadway 2 map here into contours that closely parallel the probable positions of these known scatterers and are shown at 112 and 114 respectively. The shot is indicated at 111. The anomolous peak identified in FIG. 11 transforms into a set of extended contours 116 that lie in the middle of the panel almost parallel to the two roadways 2 and 3. An interpretation of these contours, consistent with the assumption of a very narrow abutment zone, is that they indicate, at best, the location of a region of very high localised stress in the middle of the panel, or, at worst, a previously unsuspected line fault with which future mining must contend.

From the above description it can be seen that an improved method of and apparatus for locating disturbances in mineral seams is provided.

Having now particularly described and ascertained our said invention and in what manner the same is to be performed, we declare that what we claim is:

1. A method of locating disturbances in a mineral seam characterized by locating in the seam underground at a first area an array of detector means and at a second area wave energy source means, operating the source means to generate seismic waves and detecting the waves in the detector means and converting said detections into electrical signals, processing said signals to produce recompressed signals and producing a holograph from said recompressed signals, said holograph indicating any disturbances in the form of an exponential characteristic related to wave phase and group velocities.

2. The method according to claim 1 wherein at least one of the detector means and source means comprises plural spaced means in an array.

3. The method according to claim 2 wherein the detector means comprises an array of spaced detectors and the source means comprises an array of synchronized point sources.

4. The method according to claim 1 wherein the detecting comprises detecting reflections.

5. The method according to claim 1 wherein the waves have a frequency band and wherein the exponential characteristic is related to phase and group velocities of a center frequency of the band.

6. A method as claimed in claim 1 characterized in that the recompression is performed by spectrally warping the electrical signals.

7. A method as claimed in claim 1 characterized in that the recompression is performed by passing the electrical signals through a time varying finite impulse response pulse compression filter.

8. A method as claimed in claim 1, characterized in that the exponential characteristic is identified according to the formula:

$$I(x,y) = \left| \sum_{n=1}^{N} S_n(t_n) \exp[i\omega_c(1 - c_p/c_g)t_n] \right|^2$$

wherein
I x,y is a point or picture cell on a map,
x and y being coordinates,
$S_n$ is signal amplitude at the detector
$t_n$ is travel time lag associated with the picture cell and any particular detector
$\omega_c$ is center frequency of a bank and
$c_p$ and $c_g$ are phase group velocities at the center frequency.

9. A method according to claim 8 characterized in that the said processing includes employing focussed elliptical time lag sum imaging and $t_n$ is time lag between a source, the image point (Ix,y) and a detector.

10. A method of locating disturbances in a mineral seam comprising the steps of locating in the seam underground at a first area an array of detectors and at a second area a point source of sound, operating the point source to generate seismic waves and detecting reflections of the waves in the array of detectors and converting said reflections into electrical signals, processing said signals to produce a recompressed signal and producing a holograph indicating any disturbances in the form of an exponential characteristic related to the phase and group velocities of the centre frequency of the frequency band.

11. A method according to claim 10 in which the said processing includes employing a focussed radial time lag sum imaging technique.

12. A method according to claim 10 in which the said processing includes employing a focussed elliptical time lag sum imaging technique.

13. A method according to claim 10 in which the said processing includes employing both a focussed radial and a focussed elliptical time lag sum imaging technique.

14. A method according to claim 10 including the step of removing any noise element from the signal prior to recompressing it.

15. A method as claimed in claim 10 in which the recompression is performed by warping the spectra of the electrical signals.

16. A method as claimed in claim 10 in which the recompression is performed by passing the electrical signals through a time varying, finite impulse response pulse compression filter.

17. A method as claimed in claim 10 in which the exponential characteristic is identified according to the formula:

$$I(x,y) = \left| \sum_{n=1}^{N} S_n(t_n) \exp[i\omega_c(1 - c_p/c_g)t_n] \right|^2$$

18. A method of locating disturbances in a mineral seam comprises locating disturbances in a mineral seam and including the steps of locating in the same seam underground at a first area, an array of detectors and at a second area a point source of sound, operating the point source to generate siesmic waves and detecting reflections of the waves in the array of detectors and converting said reflections into electrical signals, processing said signals to remove noise and to produce a recompressed signal, producing a holograph indicating any disturbances in the form of an exponential characteristic identified by the formula:

$$I(x,y) = \left| \sum_{n=1}^{N} S_n(t_n) \exp[i\omega_c(1 - c_p/c_g)t_n] \right|^2$$

19. A method as claimed in claim 18 in which the recompression is affected by warping the spectra of the electrical signals.

20. Apparatus for locating disturbances in a mineral seam comprising a source of seismic waves, an array of detectors for detecting the waves and processing electrical signals generated by the detectors when waves are detected, the processing means including means for recompressing the signals and further means arranged to produce a holograph of the seam from the recompressed signals.

* * * * *